UNITED STATES PATENT OFFICE.

EMILE THEODORE BUNDSMANN, OF POINT LOMA, CALIFORNIA, ASSIGNOR TO KATHERINE TINGLEY, OF POINT LOMA, CALIFORNIA.

COMBINATION FOR AND THE PROCESS OF MANUFACTURING ARTIFICIAL STONE.

No. 839,722.      Specification of Letters Patent.      Patented Dec. 25, 1906.

Application filed November 21, 1905. Serial No. 288,371.

*To all whom it may concern:*

Be it known that I, EMILE THEODORE BUNDSMANN, a citizen of the United States, residing at Point Loma, in the city and county of San Diego and State of California, have invented new and useful Improvements in Combinations for and the Process of Manufacturing Artificial Stone, of which the following is a specification.

A composition of matter combined for the purpose of making new and improved artificial stones: a composition containing graywacke, sea-sand, granulite in combination with a saturated solution of silicon dioxid in potassium silicate with hydrosilico-fluoric acid in combination with well-known brands of cement. These constituents combined to make artificial stones of great density, hardness, and power of resistance. Stones thus artificially made and impregnated with such substances as earth-wax, ozocerite, or ceresin are waterproof and can be used for all building purposes or *in situ* for pavements, &c. Through the reduction of the mass to the consistency of a powder innumerable superfices are presented for the action of chemicals, thus causing the perfect petrifaction of the mass and insuring great density. Through the "setting process" of the finely-powdered mass the unaffected saturated solution of silicon dioxid in potassium silicate is squeezed through the surface, when coming in contact with hydrosilico-fluoric acid and atmosphere silicon dioxid is deposited upon the surface of the stone, producing a solid smooth glazed surface. The ozocerite or ceresin is applied to the molds, thus preventing adhesion and subsequent possible cracking of the stone through the first contraction of the mass. At the same time enough of the wax is absorbed by the stone to give a waterproof surface.

The process is as follows: Seven parts, by weight, of graywacke and ten parts, by weight, of sea-sand to the twelve to fifteen parts, by weight, of cement are mixed and powdered to dust. A sample of this powder mixture rubbed between the finger-tips should not feel gritty. Add to this mixture ten parts, by weight, of a saturated solution of silicon dioxid dissolved in potassium silicate, fifty parts commercial solution of potassium silicate, (or its dry equivalent,) and two parts silicon dioxid, ten parts, by weight, of water. Reduce the mass to the consistency of paste and mix thoroughly for seven minutes. Pour this mass into a form and let it settle for twelve hours. After this the stone is air-dried or dried at a temperature of 100° centigrade, becoming extremely porous. This porous stone is immersed in ten parts, by weight, of hydrosilico-fluoric acid (specific gravity 1.06—7½ per cent.) diluted with fifty parts, by weight, of water. The stone should remain in this solution for another twelve hours. The stone can be air dried.

Another application of the process, especially adapted to *in situ* work on account of the rapid setting of the stone, is as follows: The minerals, as well as the saturated solution of silicon dioxid, are prepared in the same manner as in the foregoing process. After the mass is reduced to a paste ten parts, by weight, of hydrosilico-fluoric acid and ten parts, by weight, of water are added to the paste. The mass is stirred quickly and poured into form or used *in situ*. The compound sets instantaneously and can be taken from the form in one or two minutes.

What I claim, and desire to secure by Letters Patent of the United States, is—

1. The herein-described composition of matter, consisting of graywacke, sea-sand, granulite and cement, in combination with a saturated solution of silicon dioxid in potassium silicate with hydrosilico-fluoric acid.

2. The herein-described composition of matter for producing artificial stone, consisting of the following parts by weight: graywacke, seven parts; sea-sand, ten parts; cement, twelve to fifteen parts; saturated solution of silicon dioxid in potassium silicate, ten parts; water, ten parts; the whole saturated with a solution of hydrosilico-fluoric acid (specific gravity 1.06) ten parts; water, fifty parts.

3. The process of manufacturing artificial stone, by reducing graywacke, sea-sand, cement, to the consistency of a powder to promote chemical action, resulting in perfect petrification and density; and then subjecting the mass to the action of the saturated solution of silicon dioxid in potassium silicate: and then leaving it in molds of the desired form for a period of not less than twelve hours; and then saturating the stone with a diluted solution of hydrosilico-fluoric acid, for another period of not less than twelve hours, substantially as herein described.

In testimony whereof I have signed my name to this specification in the presence of two subscribing witnesses.

EMILE THEODORE BUNDSMANN.

Witnesses:
C. THURSTON,
BERTHA W. BUNDSMAN.